(12) United States Patent
Katagiri et al.

(10) Patent No.: US 8,756,351 B2
(45) Date of Patent: *Jun. 17, 2014

(54) TAPE DRIVE, TAPE DRIVE RECORDING SYSTEM, AND METHOD FOR SELECTING IMPROVED TAPE SPEED IN RESPONSE TO INTERMITTENT READ REQUESTS

(75) Inventors: Takashi Katagiri, Yamato (JP); Hirokazu Nakayama, Yamato (JP); Motoko Oe, Yamato (JP); Yutaka Oishi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,990

(22) Filed: Jul. 27, 2012

(65) Prior Publication Data

US 2012/0290784 A1 Nov. 15, 2012

Related U.S. Application Data

(63) Continuation of application No. 12/574,329, filed on Oct. 6, 2009, now Pat. No. 8,316,162.

(30) Foreign Application Priority Data

Oct. 10, 2008 (JP) .................................. 2008-264682
Oct. 31, 2008 (JP) .................................. 2008-281985

(51) Int. Cl.
*G06F 3/00* (2006.01)
*G11B 15/46* (2006.01)
*G11B 15/32* (2006.01)

(52) U.S. Cl.
CPC ................ *G11B 15/46* (2013.01); *G11B 15/32* (2013.01)

USPC .................. 710/52; 710/53; 710/54; 710/55; 710/56; 710/57

(58) Field of Classification Search
None
See application file for complete search history.

(56) References Cited

U.S. PATENT DOCUMENTS 4,176,380 A * 11/1979 Koski et al. ...................... 360/50
5,349,479 A * 9/1994 Arimura et al. ............. 360/73.06

(Continued)

FOREIGN PATENT DOCUMENTS

JP 6121725 2/1986
JP 62110717 7/1987

(Continued)

*Primary Examiner* — Henry Tsai
*Assistant Examiner* — Jing-Yih Shyu
(74) *Attorney, Agent, or Firm* — The Steadman Law Firm PLLC; Thomas E. Tyson

(57) ABSTRACT

A tape drive, tape drive recording system, and method are provided for improving tape speed selection during data transfer. The tape drive includes a buffer, a tape for recording the data to be temporarily stored in the buffer, and a read head. The tape drive further includes a reading controller that initially sets a tape speed such that a drive transfer rate matches a host transfer rate as closely as possible and that drives the tape at the tape speed. To address backhitching caused by one or more host transfer halts, the reading controller subsequently adjusts the tape speed such that the drive transfer rate is lower than the host transfer rate by recalculating the host transfer rate in consideration of the host transfer and the host transfer halt and setting the tape speed such that the drive transfer rate matches the recalculated host transfer rate as closely as possible.

9 Claims, 6 Drawing Sheets

(56) References Cited

U.S. PATENT DOCUMENTS

| | | | | |
|---|---|---|---|---|
| 5,742,444 | A * | 4/1998 | Ozue | 360/60 |
| 5,969,897 | A * | 10/1999 | Morita | 360/73.01 |
| 6,307,701 | B1 * | 10/2001 | Beavers et al. | 360/73.08 |
| 6,958,878 | B2 * | 10/2005 | Jaquette et al. | 360/73.04 |
| 7,023,651 | B1 * | 4/2006 | Peterson | 360/77.12 |
| 7,218,468 | B2 * | 5/2007 | Jauette et al. | 360/48 |
| 7,496,696 | B2 | 2/2009 | Katagiri et al. | |
| 7,710,681 | B2 * | 5/2010 | Itagaki et al. | 360/73.01 |
| 2003/0001036 | A1 * | 1/2003 | Beavers et al. | 242/334.5 |
| 2003/0128448 | A1 | 7/2003 | Gunderson et al. | |
| 2004/0264022 | A1 | 12/2004 | Kimura | |
| 2004/0264023 | A1 | 12/2004 | Kimura et al. | |
| 2006/0256466 | A1 * | 11/2006 | Katagiri et al. | 360/75 |
| 2007/0226336 | A1 | 9/2007 | Katagiri et al. | |
| 2008/0007856 | A1 * | 1/2008 | Tango et al. | 360/53 |
| 2008/0285166 | A1 | 11/2008 | Katagiri et al. | |
| 2008/0304174 | A1 * | 12/2008 | Itagaki et al. | 360/73.01 |
| 2009/0125649 | A1 * | 5/2009 | Goker et al. | 710/57 |

FOREIGN PATENT DOCUMENTS

| | | | | |
|---|---|---|---|---|
| JP | 6418430 | 1/1989 | | |
| JP | 3137873 | 6/1991 | | |
| JP | 3137874 | 6/1991 | | |
| JP | 4026991 | 1/1992 | | |
| JP | 4134526 | 5/1992 | | |
| JP | 4265557 | 9/1992 | | |
| JP | 4368673 | 12/1992 | | |
| JP | 5012813 | 1/1993 | | |
| JP | 5307444 | 11/1993 | | |
| JP | 6131826 | 5/1994 | | |
| JP | 6202814 | 7/1994 | | |
| JP | 7287674 | 10/1995 | | |
| JP | 2634703 | 7/1997 | | |
| JP | 9213003 | 8/1997 | | |
| JP | 2675412 | 11/1997 | | |
| JP | 2724632 | 3/1998 | | |
| JP | 2732884 | 3/1998 | | |
| JP | 10-199071 | * | 7/1998 | G06F 3/06 |
| JP | 2895360 | 5/1999 | | |
| JP | 2954055 | 7/1999 | | |
| JP | 11249821 | 9/1999 | | |
| JP | 2000057510 | 2/2000 | | |
| JP | 2000311064 | 11/2000 | | |
| JP | 3156552 | 4/2001 | | |
| JP | 2001242978 | 9/2001 | | |
| JP | 2001283503 | 10/2001 | | |
| JP | 2002093067 | 3/2002 | | |
| JP | 2002093122 | 3/2002 | | |
| JP | 2002528835 | 9/2002 | | |
| JP | 3427467 | 5/2003 | | |
| JP | 2003137873 | 5/2003 | | |
| JP | 2003137874 | 5/2003 | | |
| JP | 2003233938 | 8/2003 | | |
| JP | 3467777 | 11/2003 | | |
| JP | 2003346416 | 12/2003 | | |
| JP | 2004026991 | 1/2004 | | |
| JP | 2004134526 | 4/2004 | | |
| JP | 2004319030 | 11/2004 | | |
| JP | 2004355748 | 12/2004 | | |
| JP | 2005012813 | 1/2005 | | |
| JP | 2005307444 | 11/2005 | | |
| JP | 2006024291 | 1/2006 | | |
| JP | 2006131826 | 5/2006 | | |
| JP | 2006221695 | 8/2006 | | |
| JP | 2006245904 | 9/2006 | | |
| JP | 2006-318571 | * | 11/2006 | G11B 20/10 |
| JP | 2006318571 | 11/2006 | | |
| JP | 2007241897 | 9/2007 | | |
| JP | 2007287674 | 11/2007 | | |
| JP | 2008016117 | 1/2008 | | |

\* cited by examiner

TAPE DRIVE, TAPE DRIVE RECORDING SYSTEM, AND METHOD FOR SELECTING IMPROVED TAPE SPEED IN RESPONSE TO INTERMITTENT READ REQUESTS

CROSS-REFERENCE TO RELATED APPLICATIONS

The present application is a continuation application of U.S. patent application Ser. No. 12/574,329, filed Oct. 6, 2009. The present application claims priority under 35 U.S.C. §120 to U.S. patent application Ser. No. 12/574,329, which claims priority under 35 U.S.C. §119 to Japanese Patent Application No. 2008-264682, filed Oct. 10, 2008, and to Japanese Patent Application No. 2008-281985, filed Oct. 31, 2008, the contents of which are incorporated herein by reference.

TECHNICAL FIELD

The various embodiments described herein relate to a tape recording apparatus (i.e., tape drive) for improving data transfer to a higher apparatus (e.g., host) in response to intermittent read requests. The various embodiments further relate to a method for selecting an improved tape speed for reading data.

BACKGROUND OF THE INVENTION

The various embodiments described herein are applicable to a sequential data recording apparatus, such as a tape drive based on the linear tape-open (LTO) standard or a large tape drive targeted for enterprises (e.g., IBM 3592).

During operation of such tape drive, to cut waste in storage capacity, it is necessary to minimize an interval between data elements written on a tape in the longitudinal direction. In addition, a subsequent data element needs to be read immediately after a previous data element is read from the tape. To carry out such sequential writing/reading, the transport speed of the tape is reduced, the tape is temporarily stopped, and the tape is rewound in the reverse direction. Such rewinding moves the head back to the appropriate place for writing/reading, and the head performs motor-operated writing/reading with respect to the subsequent data element. A series of motor-driven operations for rewinding the tape is called a backhitch. A backhitch typically requires 2-3 seconds.

During a data read, a buffer of the tape drive may fill with data read from the tape when a data transfer rate from the tape to a buffer memory inside the tape drive (i.e., drive transfer rate) is higher than a data transfer rate from the buffer memory to a host (i.e., host transfer rate). In such case, once the buffer runs out of space to store subsequent data read from the tape, the tape drive must stop reading data from the tape. Once the tape drive stops reading, backhitching is performed to prepare for reading the subsequent data. Such backhitching results in overhead, thereby impeding data transfer to the host (i.e., host transfer).

Japanese Unexamined Patent Application No. 2006-318571 describes a technique for changing tape speed in accordance with a host transfer rate to avoid an impact on the performance of data transfer caused by a negative effect of backhitching on motion of the tape. The data transfer rate for writing/reading performed by the tape drive is uniquely determined by adjusting tape speed in accordance with the measured host transfer rate.

Specifically, during a data read, if the host transfer rate is lower than the drive transfer rate, data read from the tape accumulates in the buffer inside the tape drive. When the buffer becomes full of data read from the tape, even if more data is read from the tape, the read data cannot be transferred to the buffer. At such time, the tape drive produces a backhitch and begins moving the tape to the place immediately after the lastly read data. During the backhitch, the host continues to read data, and the tape drive continues to send the data stored in the buffer to the host. If the buffer becomes empty of data before completion of the backhitch, the host waits for transmission of subsequent data to the buffer after completion of the backhitch. Thus, the time required by the backhitch has a significant negative impact on the host transfer rate. Accordingly, the technique described in Japanese Unexamined Patent Application No. 2006-318571 adjusts the tape speed such that the drive transfer rate matches the host transfer rate as closely as possible. In accordance with this technique, the host transfer rate is measured inside the drive, and the tape speed is adjusted in response to such measurement. If the host continues to read data at a constant speed, the host transfer rate can be readily measured. However, this technique does not adequately address a case in which the host transfer rate significantly changes. Since the measurement varies depending on what point in time the host transfer rate is measured, and since it is unclear how the host will read data in the future, it is difficult to determine the best tape speed for a long time frame.

Japanese Unexamined Patent Application Publication (Translation of PCT Application) No. 2002-528835 describes a method for seamlessly changing the tape speed in accordance with the status of the buffer or the host transfer rate in order to prevent buffer overrun and buffer underrun. The method reduces the frequency of backhitches when the host transfer rate is constant or changes subtly. However, this method is not substantially beneficial if the host transfer rate significantly changes and/or a plurality of intermittent data transfers occur. Because synchronization of the host transfer rate and the drive transfer rate is always intended, an adverse reaction resulting in a backhitch may occur when the host transfer rate significantly changes (e.g., when data transfer to the host side temporarily halts).

Accordingly, with known techniques, overhead caused by occurrence of a backhitch cannot be reduced when the host transfer rate significantly changes (e.g., as a result of a plurality of intermittent read requests).

SUMMARY OF THE INVENTION

The various embodiments described herein provide a tape drive and a tape drive recording system capable of selecting an improved tape speed at which the performance of transferring data to a host is not degraded. In addition, a method is provided for selecting an improved tape speed for use therein. The tape drive, tape drive recording system, and method reduce the negative effects of backhitching when intermittent host transfers occur.

In accordance with a first aspect of the various embodiments, a tape drive is provided for transferring data to a host (i.e., performing a host transfer) when the host issues a plurality of read requests. The tape drive addresses situations in which a host transfer halt occurs subsequent to a host transfer. A host transfer halt is an interval during which data transfer temporarily stops. The tape drive comprises a buffer, a tape, a read head, and reading controller. The buffer temporarily stores data to be transferred to the host. The tape records the data to be temporarily stored in the buffer. The read head reads data recorded on the tape and sequentially stores the data in the buffer. The reading controller initially sets a tape speed such that a drive transfer rate matches a host transfer rate as closely as possible. Moreover, the reading controller drives the tape at the tape speed. Furthermore, the reading controller measures an amount of data stored in the buffer during a host transfer halt subsequent to a host transfer and determines whether the buffer is full of data. If the reading controller determines that the buffer is full of data, the reading controller adjusts the tape speed such that the drive transfer rate is lower than the host transfer rate. Additionally, the reading controller may invoke backhitching when the buffer becomes full of data.

In accordance with an exemplary embodiment, the reading controller may adjust the tape speed such that the drive transfer rate is lower than the host transfer rate by recalculating the host transfer rate in consideration of the host transfer and the host transfer halt and then setting the tape speed such that the drive transfer rate matches the recalculated host transfer rate as closely as possible. The reading controller may recalculate the host transfer rate on the basis of measured backhitching attributes resulting from the host transfer halt. More specifically, the reading controller may measure a time interval between beginning points of a first backhitch and a second backhitch and may measure an amount of data transferred during such time interval. Then, the reading controller may recalculate the host transfer rate on the basis of the time interval and an amount of data transferred during the time interval.

In accordance with a second aspect of the various embodiments, a tape drive recording system may be provided comprising a host and the above-described tape drive. The tape drive is connected to the host and transfers data to the host.

In accordance with a third aspect of the various embodiments, a method is provided for selecting a tape speed for transferring data from a tape drive to a host when the host issues a plurality of read requests containing a host transfer halt. The above-described tape drive may be used in conjunction with the method. The method may comprise initially setting the tape speed such that the drive transfer rate matches the host transfer rate as closely as possible, driving a tape at the tape speed, measuring an amount of data stored in the buffer during a host transfer halt subsequent to a host transfer, determining whether a buffer of the tape drive is full of data, and adjusting the tape speed such that the drive transfer rate is lower than the host transfer rate if the buffer is full of data. In addition, the method may comprise invoking backhitching when the buffer becomes full of data.

In accordance with an exemplary embodiment, the adjusting step of the method may comprise recalculating the host transfer rate in consideration of the host transfer and the host transfer halt and may further comprise setting the tape speed such that the drive transfer rate matches the recalculated host transfer rate as closely as possible. The recalculating step may comprise measuring backhitching attributes resulting from the host transfer halt. The measured backhitching attributes may include a time interval between beginning points of a first backhitch and a second backhitch and an amount of data transferred during the time interval.

In accordance with the various embodiments, a tape speed that is better maintained and that reduces adverse effects caused by backhitching may be determined in response to intermittent read requests from a host. In addition, monitoring the amount of data that has not yet been transferred to the host inside a buffer can prevent the tape speed from being unduly modified as a result of a temporary increase in the host transfer rate or a host transfer halt.

BRIEF DESCRIPTION OF THE DRAWINGS

The various embodiments described herein will be described in detail with reference to the following figures.

DETAILED DESCRIPTION

Figure 1:
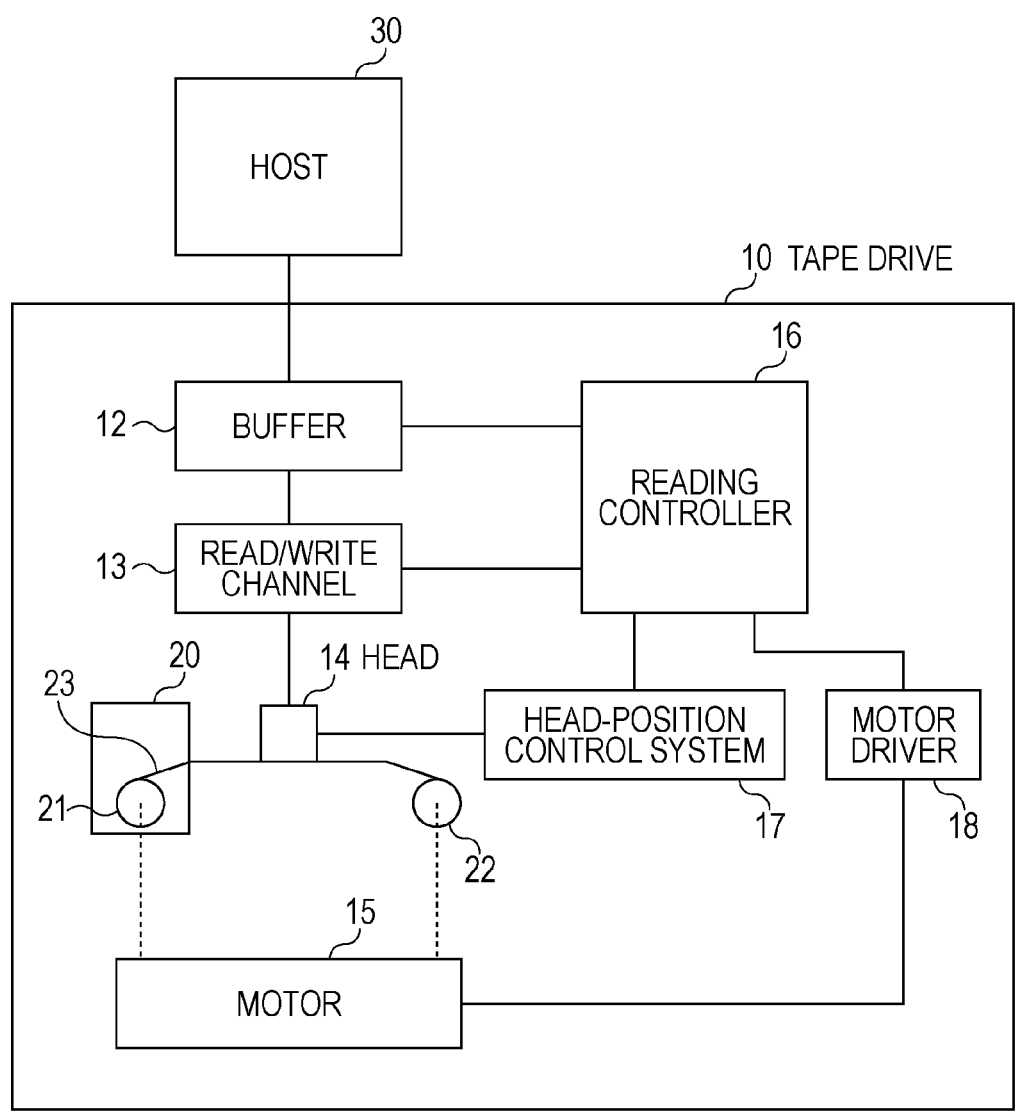
FIG. 1 illustrates a tape drive recording system that may be used in conjunction with an exemplary embodiment.

Exemplary embodiments addressing cases in which a plurality of read requests (e.g., read commands) with intervals containing host transfer halts are issued from a host to a tape drive will be described below.

An improved technique for setting a tape speed according to an aspect of the various embodiments described herein enables selection of an improved tape speed with respect to not only a host transfer rate but also an interval between backhitches occurring when a buffer becomes full. Three major characteristics of the improved technique are as follows:

1. The host transfer rate not only may be measured but also may be recalculated in consideration of the duration of a host transfer halt. The host transfer rate may be recalculated from an interval between the beginning points of backhitches occurring when the buffer becomes full (e.g., duration of a host transfer halt, overhead time). Subsequently, an improved tape speed may be selected such that the drive transfer rate matches the recalculated host transfer rate as closely as possible.

2. Since the various embodiments explicitly take into account a host transfer halt occurring between host transfers, the various embodiments may refrain from selecting a faster tape speed, even when the host transfer rate is significantly higher than the drive transfer rate, if selecting a faster tape speed would adversely affect performance for the long term.

3. The tape speed may be increased when the host transfer rate is significantly increased with respect to the drive transfer rate of reading data from the tape for the long term. Such case occurs when large data elements are continuously transferred to the host without a host transfer halt or when there is a relatively short host transfer halt between transfers. In either case, the tape speed is set such that the drive transfer rate matches the host transfer rate as closely as possible, as is the case with known techniques.

A method for deriving a recalculated host transfer rate H* on the basis of a host transfer rate H and a duration of time including a host transfer halt is described herein in accordance with an exemplary embodiment. In an actual environment, the host transfer rate often significantly varies, and intermittent data transfers often occur. In one example case, a host transfer of 320 MB of data is performed. In such case, the host transfer rate during which data is read consistently at 160 MB/sec measures 160 MB/sec (derived from 320 MB/(320 MB/[160 MB/sec])). However, when a 1-second host transfer halt is factored into the calculation, the host transfer rate becomes approximately 106 MB/sec (derived from 320 MB/ ([320 MB/[160 MB/sec]]+1 sec)). The use of 160 MB/sec as the reference host transfer rate for determining tape speed, and not 106 MB/sec, results in the buffer becoming full, and thus a backhitch results. On the other hand, if the duration of a host transfer halt is factored into the calculation such that the recalculated host transfer rate of 106 MB/sec is used as the reference host transfer rate, backhitching may be reduced, since the relatively lower recalculated host transfer rate may reduce the frequency of buffer fills. Accordingly, selecting the tape speed such that the drive transfer rate matches the recalculated host transfer rate as closely as possible can reduce negative effects of backhitching on the performance of host transfer for the long term.

FIG. 1 illustrates an example of a tape drive recording system that may be used in conjunction with an exemplary embodiment. The tape drive recording system comprises a tape drive 10 and a host 30 connected thereto. The tape drive 10 writes a plurality of data elements (e.g., user data elements) transmitted from the host 30 on a tape 23 and reads them therefrom in fixed-length data set units. The tape 23 has a fixed-length format structure. A data set is a collection of data elements recorded on the tape 23.

The tape drive 10 comprises a buffer 12, a read/write channel 13, a head 14, a motor 15, and reels 21 and 22 around which the tape 23 is wound. The tape drive 10 further comprises a reading controller 16, a head-position control system 17, and a motor driver 18. The motor 15 may comprise two motors. The tape drive 10 further comprises a detachable tape cartridge 20 mounted therein.

The tape cartridge 20 comprises the tape 23 wound around the reel 21. The tape 23 moves longitudinally in the direction from the reel 21 to the reel 22 or from the reel 22 to the reel 21 together with the rotation of the reels 21 and 22. The tape 23 may be magnetic or of another type. The head 14 is used to write information on the tape 23 or to read information from the tape 23 while the tape 23 moves longitudinally. The motor 15 rotates the reels 21 and 22.

The reading controller 16 controls the overall tape drive 10. The reading controller 16 controls writing data on the tape 23 or reading data from the tape 23 in accordance with a command received from the host 30. The reading controller 16 further controls the head-position control system 17 and the motor driver 18 such that backhitching may be performed. Data received through the read/write channel 13 is written on or read from the tape 23 by the head 14. According to another exemplary embodiment, the tape drive 10 may comprise a write head 14a for writing data and a read head 14b for reading data.

The small computer system interface (SCSI) standards may be used as a communication standard for the interface between the tape drive 10 and the host 30. When SCSI are used, the host 30 issues a Write command for writing data to the tape drive 10, a Read command for reading data from the tape drive 10, and a Locate or Space command for specifying the location of a variable-length data element to the tape drive 10.

The buffer 12 comprises memory for storing data to be written on the tape 23 or data read from the tape 23. The buffer 12 may comprise dynamic random access memory (DRAM), for example. The buffer 12 comprises a plurality of fixed-length segments, and each of the plurality of segments stores a data set read from the tape 23 or to be written to the tape 23. One data set comprises a plurality of data elements transmitted from or to be transmitted to the host 30.

Figure 2:
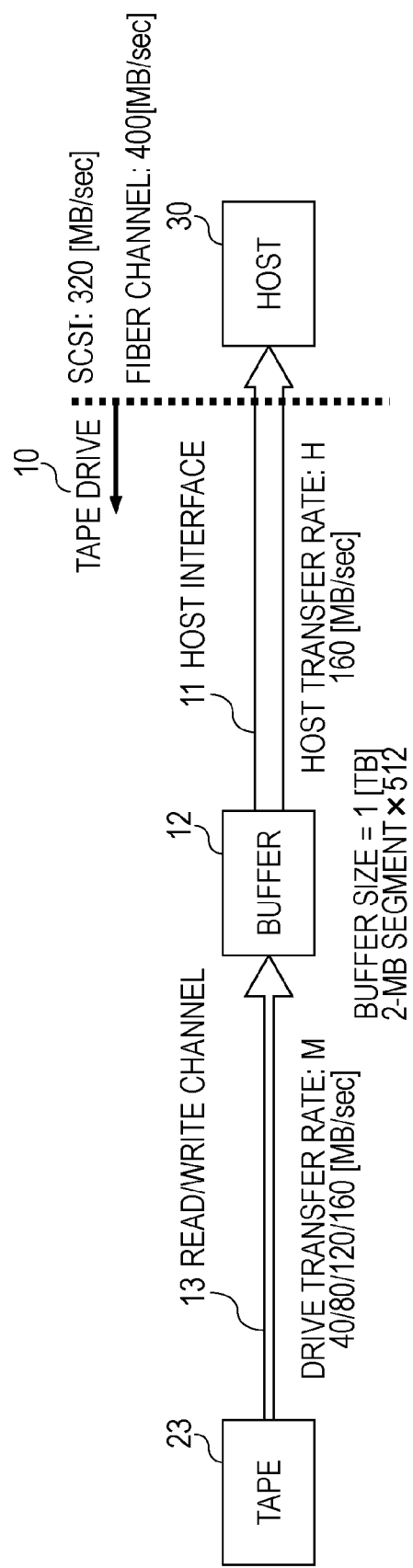
FIG. 2 illustrates a process in which after a tape drive receives from a host a request to read data, the tape drive reads the data from a tape and sends the data to the host through a buffer and an interface.

FIG. 2 illustrates a process in which after the tape drive 10 receives a request to read data from the host 30, the tape drive 10 reads the data from the tape 23 and sends the data to the host 30 through the buffer 12 and a host interface 11. The host 30 can receive data at the maximum host transfer rate H, which is assumed to be 160 MB/sec herein. The reading controller 16 of the tape drive 10 can transmit data from the tape 23 to the buffer 12 at the drive transfer rate M, which for example may be 40 MB/sec, 80 MB/sec, 120 MB/sec, or 160 MB/sec. The host transfer rate H is determined by measuring the amount of data transferred from the buffer 12 to the host 30 per unit time. The drive transfer rate M is uniquely defined by the tape speed and the recording density of the tape.

When the host transfer rate H from the buffer 12 to the host 30 is lower than the drive transfer rate M from the tape 23 to the buffer 12, backhitching occurs in the tape drive 10. When the buffer 12 is full of stored data read from the tape 23, the buffer 12 cannot store additional data. To sequentially read data from the tape 23, it is necessary to read data out of the buffer 12 and to transfer the data to the host 30 such that free space becomes available in the buffer 12. To this end, positioning the head 14 at the tape location immediately after data read from the tape 23 is required, and such positioning requires a certain time (e.g., 2-3 seconds) for backhitching.

Figure 3:
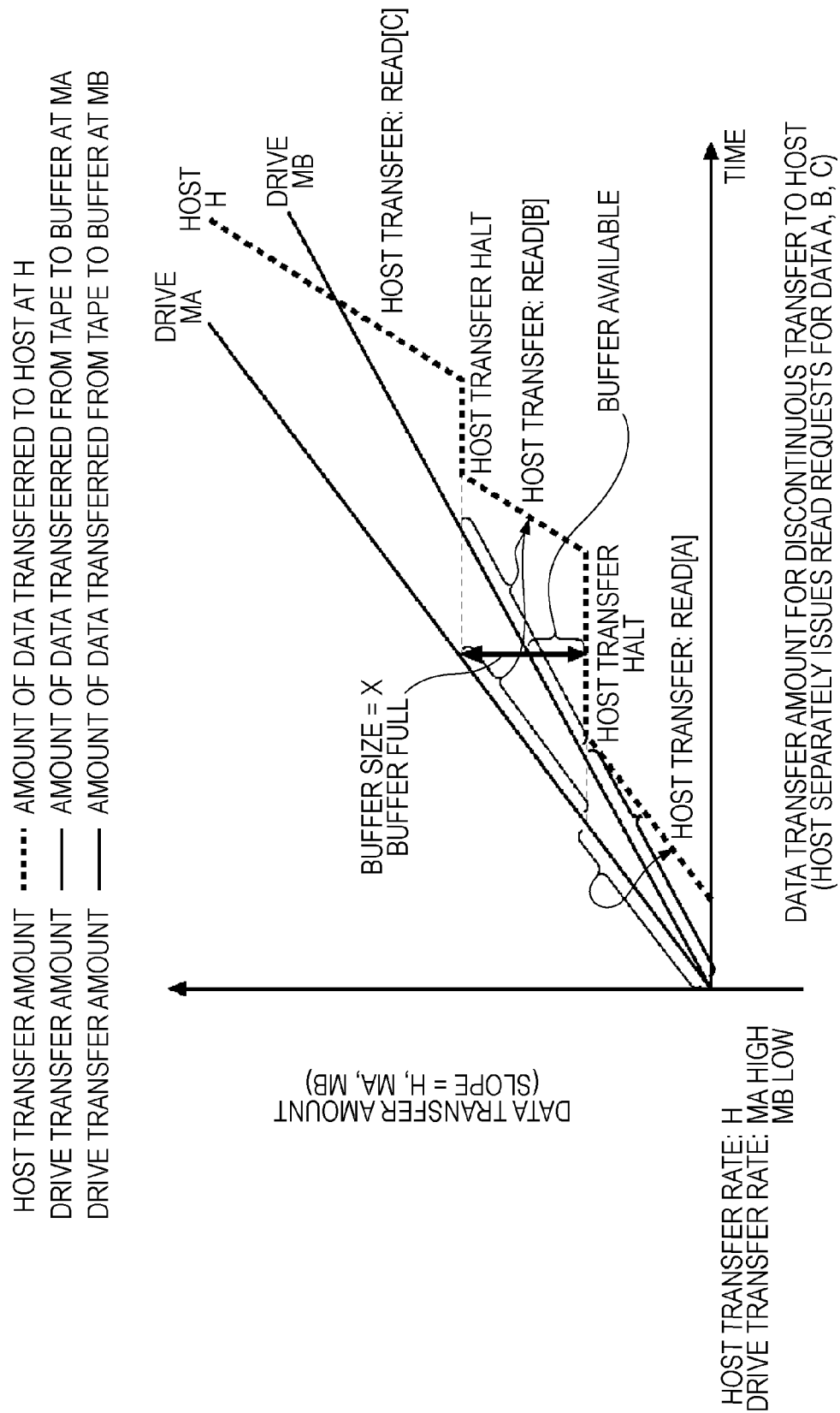
FIG. 3 illustrates the amount of data transferred to a host from a tape drive and the amount of data transferred to the tape drive from a tape at various rates in a scenario in which the tape drive receives from the host a plurality of requests to read a series of data elements.

FIG. 3 illustrates the amount of data transferred to the host 30 from the tape drive 10 and the amount of data transferred to the buffer 12 of tape drive 10 from the tape 23 at various rates in a scenario in which the tape drive 10 receives from the host 30 a plurality of requests to read a series of data elements (A, B, C, . . . ). As shown in FIG. 3, the host 30 has issued a plurality of read requests to the tape drive 10 with host transfer halts inserted therebetween.

If the host transfer rate H is measured only when an initial host transfer (Read[A]) is performed, a drive transfer rate MA is selected so as to match the host transfer rate H as closely as possible at that time. Subsequently, when the transfer to the host temporarily stops during a host transfer halt, the difference between the amount of data read from the tape 23 at the drive transfer rate MA and the amount of data transferred from the tape drive 10 to the host 30 exceeds the buffer size X. When the amount of stored data reaches the buffer size X, a backhitch occurs.

On the other hand, if a lower drive transfer rate MB is used during the initial host transfer (Read[A]), the amount of data being stored in the buffer 12 during the host transfer halt does not reach the buffer size X. Thus, no backhitch is necessary, and the buffer 12 is immediately available for a host transfer (Read[B]) subsequent to the host transfer halt. Accordingly, the drive transfer rate MB can provide better results than the drive transfer rate MA.

Figure 4:
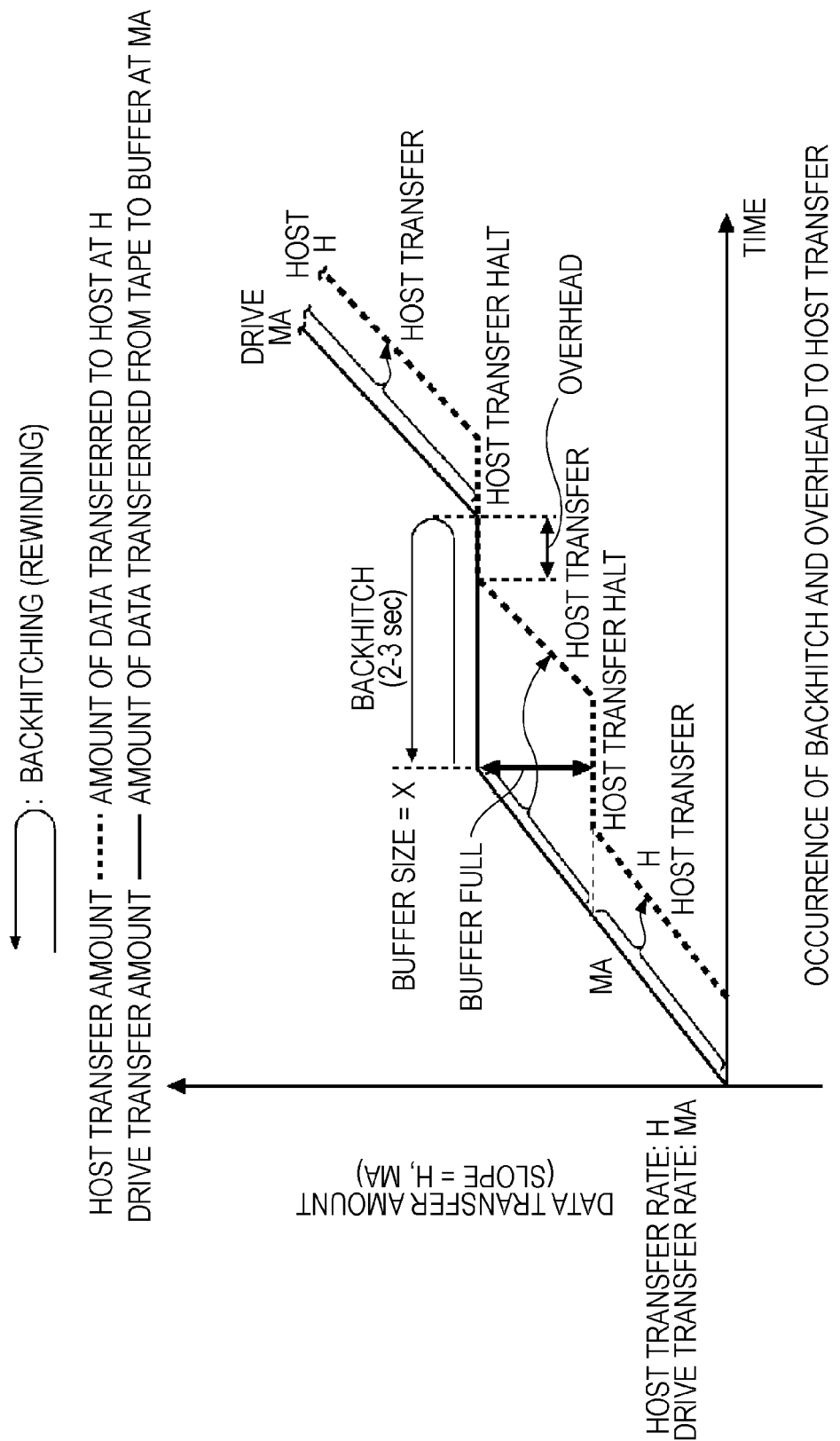
FIG. 4 illustrates the backhitching and accompanying overhead that result when a tape drive sets the tape speed in accordance with a known technique.

FIG. 4 illustrates a scenario in which overhead resulting from backhitching occurs when the tape drive 10 sets the tape speed in accordance with a known technique and receives a plurality of read requests from the host 30. During backhitching, it is possible to continue transferring data already present in the buffer 12 to the host 30. However, while the data already present in the buffer 12 can be transferred to the host 30, subsequent data cannot be transferred to the host 30 until backhitching is completed, since backhitching impedes data transfer from the tape 23 to the buffer 12. Thus, backhitching can result in a period of overhead in which data cannot be transferred to the host 30. As a result of such overhead, the overall host transfer rate H is adversely affected.

Figure 5:
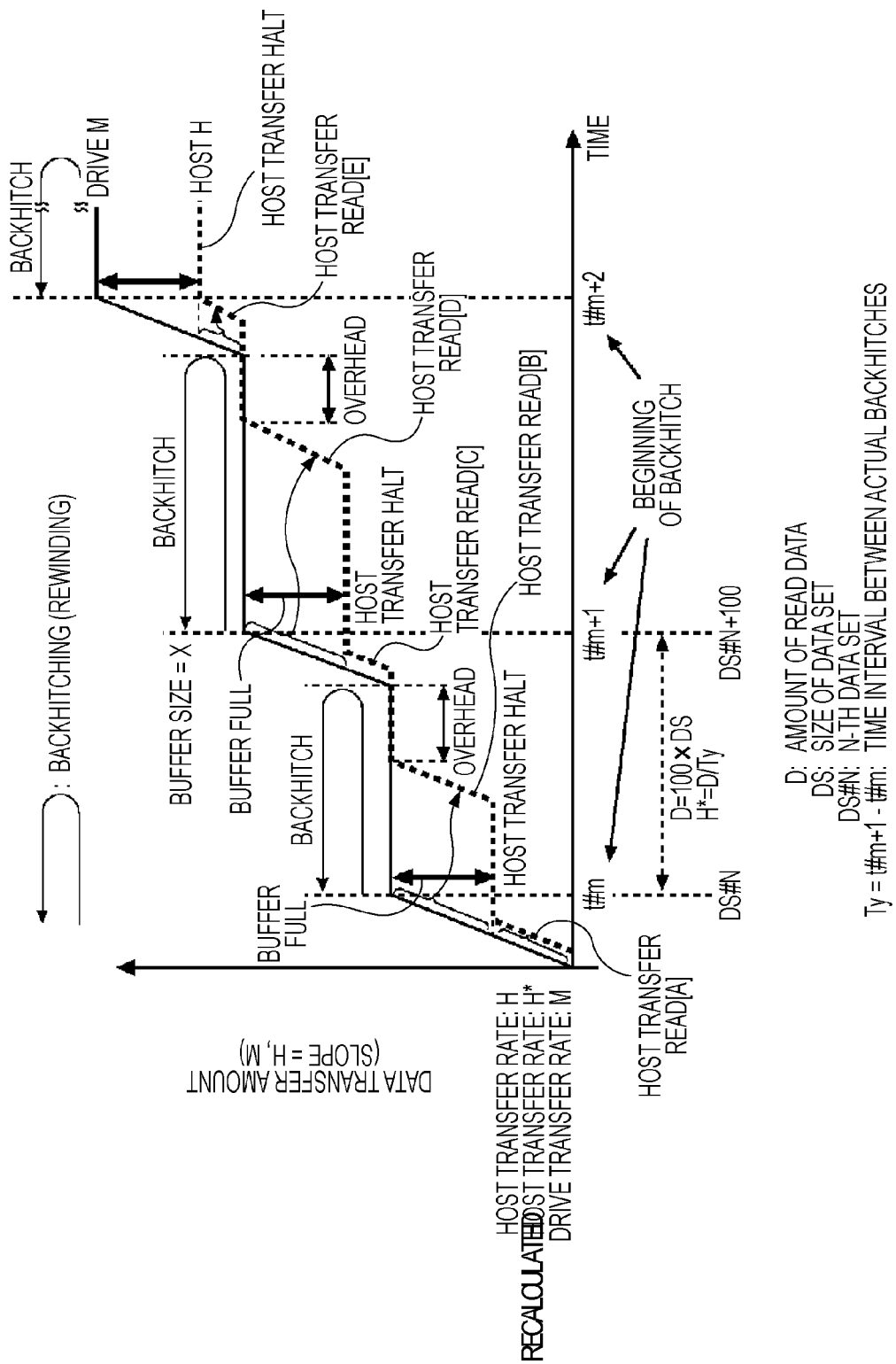
FIG. 5 illustrates in further detail the backhitching and accompanying overhead that result when a tape drive sets the tape speed in accordance with a known technique and also illustrates how backhitching attributes are measured for the purpose of setting the tape speed in accordance with an exemplary embodiment.

FIG. 5 illustrates in further detail the backhitching and accompanying overhead that result when the tape drive 10 sets the tape speed in accordance with a known technique such that the drive transfer rate M matches the host transfer rate H as closely as possible at a specific point. In addition, FIG. 5 illustrates how backhitching attributes are measured for the purpose of setting the tape speed in accordance with an exemplary embodiment. In accordance with an exemplary embodiment, in response to a plurality of read requests from the host containing host transfer halts, the host transfer rate H may be replaced with a recalculated host transfer rate H* for purposes of setting the tape speed. As further described herein, the recalculated host transfer rate H* may be derived on the basis of measured backhitching attributes resulting from the initial use of the host transfer rate H.

Typically, an application of the host 30 sequentially reads a plurality of individual data elements from the tape drive and processes them on an element-by-element basis. As described above, requests (Read[A], Read[B], Read[C], Read[D], Read [E], . . . ) to intermittently read a series of data elements (A, B, C, . . . ) are issued. If the tape speed correlates with the host transfer rate H for the initial data element (A) in accordance with a known technique, overhead resulting from backhitching occurs subsequent to a host transfer halt. More specifically, overhead resulting from backhitching may occur if the tape speed is set on the basis of an excessively high host transfer rate H in accordance with a known technique. Similarly, overhead resulting from backhitching may occur if the drive transfer rate M is selected without taking into account a series of subsequent host transfer halts in accordance with a known technique.

In accordance with an exemplary embodiment, such overhead may be avoided by recalculating the host transfer rate H on the basis of a time interval Ty (t#m+1−t#m) between the beginning points of two sequential backhitches occurring as a result of using a known technique, as provided in FIG. 5. The recalculated host transfer rate H* is utilized to adjust the drive transfer rate M for use in a subsequent host transfer. When the tape speed is selected such that the drive transfer rate M matches the recalculated host transfer rate H* as closely as possible, overhead resulting from occurrence of backhitching can be prevented in the event of a host transfer halt. In general, the recalculated host transfer rate H* used in accordance with an exemplary embodiment will be lower than the host transfer rate H used in each host transfer for the series of data elements (A, B, C, . . . ) in accordance with a known technique.

Figure 6:
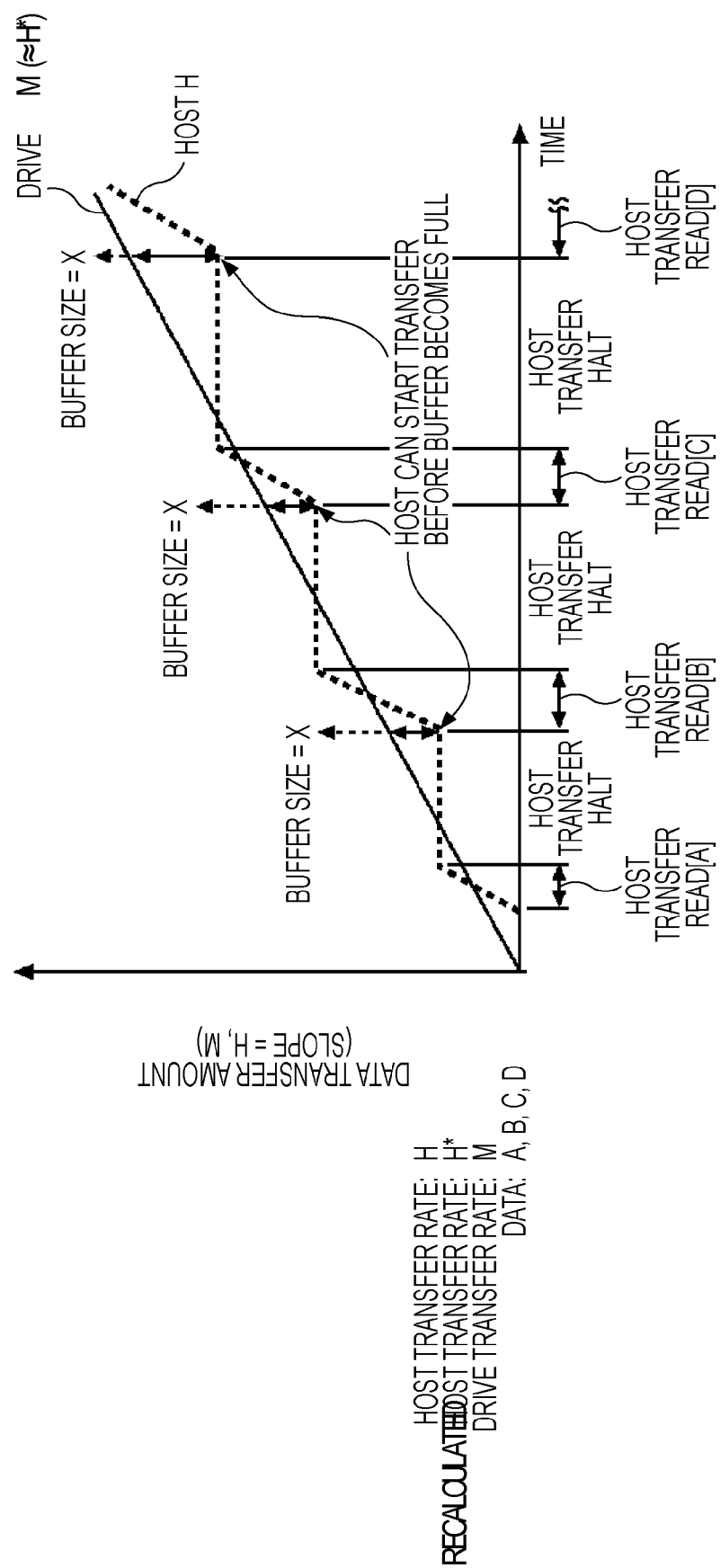
FIG. 6 illustrates the benefits of using a technique in accordance with an exemplary embodiment such that the drive transfer rate matches the recalculated host transfer rate as closely as possible.

FIG. 6 illustrates the benefits of using a technique in accordance with an exemplary embodiment such that the drive transfer rate M matches the recalculated host transfer rate H* as closely as possible. In the case in which one or more host transfer halts are present between read requests, backhitching and accompanying overhead can be reduced when the tape speed is selected by use of a recalculated host transfer rate H* that is lower than an apparent host transfer rate H in accordance with the exemplary embodiment.

Implementation of the reading controller 16 of the tape drive 10 will now be described in accordance with an exemplary embodiment. The procedure for selecting the drive transfer rate M according to such implementation is described with reference to FIGS. 5 and 6. According to an exemplary embodiment, a method is provided for determining the recalculated host transfer rate H* based on a time interval between the beginning points of backhitches occurring as a result of using a known technique. For purposes of the following description, X, B, H, and M are defined as follows:

Buffer size: X [MB]
Buffer storage rate: Rate at which data is stored in the buffer: B [MB/sec]
Host transfer rate: Transfer rate at which data is transferred from the tape drive to the host: H [MB/sec]
Drive transfer rate: Transfer rate at which data is read from the tape by the tape drive: M [MB/sec]

To effectively process a read request from the host, the tape speed may be selected such that the drive transfer rate M satisfies M>H. If M>H, data is available in the buffer 12, and thus a host transfer need not wait for a drive transfer. However, in accordance with a known technique, the drive transfer rate M may be only slightly higher than the host transfer rate H to enhance synchronization between a host transfer and a drive transfer. More specifically, to avoid a backhitch, the tape speed is provided such that the drive transfer rate M matches the host transfer rate H as closely as possible (i.e., M≈H). The buffer storage rate B is calculated by B=M−H. Accordingly, in theory, the time Tx up to when the buffer becomes full is obtained by Tx=X/B.

FIG. 5 shows that when the drive transfer rate M is determined in accordance with a known method, a backhitch occurs at the time t#m, and a subsequent backhitch occurs at the time t#m+1. The host transfer rate H and the drive transfer rate M measured by the drive at the time t#m and at the time t#m+1 are defined as follows:

The host transfer rate measured at the time t#m is H#m [MB], and the drive transfer rate measured at the time t#m is M#m [MB].
The host transfer rate measured at the time t#m+1 is H#m+1 [MB], and the drive transfer rate measured at the time t#m+1 is M#m+1 [MB].

The time interval Ty=t#m+1−t#m [sec] from the beginning point of a first backhitch to the beginning point of a second backhitch and the amount of read data D [MB] read from the tape in the time interval Ty are obtained. For example, in FIG. 5, 100 data sets (DS) are provided as the amount of read data D.

If H#m measured at the time t#m leads to selection of a tape speed satisfying H#m<M#m, then the theoretical time interval Tx between backhitches is Tx=X/(M#m−H#m). If the actually measured time interval Ty between backhitches is smaller than the theoretical time interval Tx, then it is clear that the host transfer rate H#m referred to in selecting the drive transfer rate M#m at the time t#m is higher than it should be. In accordance with an exemplary embodiment, overhead can be reduced by using the recalculated host transfer rate H* (H*=D/Ty). As illustrated in FIG. 6, the recalculated host transfer rate H* may take into account the duration of a host transfer halt and overhead time. Since use of the recalculated host transfer rate H* can reduce backhitches in terms of long-term host transfer, degradation in host transfer performance can be avoided.

The technical significance of Ty<Tx as mentioned above is described below in the context of backhitch occurrence and tape speed selection. The theoretical backhitch time interval Tx is determined by Tx=X/(M−H). To smoothly process a reading request from the host, the drive transfer rate M should be somewhat higher than the host transfer rate H. However, to prevent a backhitch caused by the buffer becoming full of data, in accordance with a known technique the drive transfer rate M is selected such that M≈H. Accordingly, the theoretical time interval Tx between backhitches is long. In other words, theoretically, M is approximately equal to H to prevent occurrence of a backhitch. An estimation of Ty<Tx for the time interval Ty between the actual adjacent backhitch reveals that the subsequent backhitch occurs earlier than theorized.

Accordingly, the drive transfer rate M selected by the reading controller in accordance with a known technique is based on the host transfer rate H being higher than it actually should be. The host transfer rates H#m and H#m+1 at specific points t#m and t#m+1 respectively are determined without considering the duration of a host transfer halt and overhead time resulting from a backhitch.

The various embodiments described herein take into account Ty<Tx. That is to say, in accordance with an exemplary embodiment, the recalculated host transfer rate H* may be determined on the basis of the time Ty, and the recalculated host transfer rate H* may take into account the duration of a host transfer halt and overhead time resulting from a backhitch in addition to the time of a host transfer.

If a determination is made only from comparison between the start time t#m of a backhitch and the start time t#m+1 of the subsequent backhitch, the determination may be based on a simple change in the transfer rate to the host side. When backhitching attributes are repeatedly measured in a certain time period, the tape speed calculated from the time interval Ty between backhitches is selected in accordance with an exemplary embodiment.

After the tape speed calculated from the interval Ty between backhitches is selected in accordance with an exemplary embodiment, the host transfer rate H may be increased temporarily due to the host restarting data transfer after a host transfer halt. At such time, it may seem from the viewpoint of the host transfer rate H that the current tape speed is lower than it should be, and thus a slightly higher drive transfer rate M should be selected. However, changes to the drive transfer rate M and tape speed in accordance with the various embodiments described herein should only be made if such changes will be beneficial for the long term. If the drive transfer rate M is increased again on the basis of the host transfer rate H, a backhitch may occur again. Accordingly, even after the drive transfer rate M calculated from the backhitch interval Ty is selected, it is necessary to determine whether the current tape speed is suited for the host transfer rate H for the long term.

If the current tape speed is suited for the host transfer rate H for the long term, then the drive transfer rate M is not increased despite a temporary increase in the host transfer rate H.

Conversely, if the host transfer rate H is high over the long term and there is a need to increase the tape speed, it is also necessary to increase the drive transfer rate M. To this end, a determination whether the tape speed is suited for the host transfer rate H for the long term is made by monitoring the state inside the buffer. For example, if a state arises in which the host transfer rate H is higher than the drive transfer rate M, and such state continues, the data read from the tape is immediately transferred to the host from the buffer. Accordingly, the amount of data in the buffer that has not yet been transferred to the host remains significantly small. In such case, the host transfer rate is determined to be high for the long term, and the tape speed is increased. However, if a state arises in the buffer in which the amount of data that has not yet been transferred to the host is increased, and such state continues, the current drive transfer rate M is determined to be appropriate for the host transfer rate H, and the tape speed is not increased.

In accordance with an exemplary embodiment, a process for selecting the next drive transfer rate M when the buffer becomes full now will be described. First, as illustrated in FIG. 5, the drive transfer rate M is selected, and the actual backhitch start times t#m, t#m+1, t#m+2, ... are measured via a known method. The actually measured backhitch time interval Ty is obtained by Ty=t#m+1−t#m, and the theoretical backhitch time interval Tx is obtained by Tx=X/(M#m−H#m).

When the time interval Ty between two temporally continuous backhitches is smaller than Tx (i.e., if Ty<Tx), the reading controller 16 determines the tape speed on the basis of the backhitch interval Ty. That is, the reading controller 16 selects the tape speed such that the drive transfer rate M matches the recalculated host transfer rate H* (=D/Ty) as closely as possible in accordance with an exemplary embodiment. Conversely, if Ty≥Tx, the reading controller 16 selects the tape speed such that the drive transfer rate M matches the host transfer rate H as closely as possible (i.e., M≈H) in accordance with a known technique.

The above exemplary embodiments are for illustrative purposes only, and the various embodiments described herein are not limited thereto. For example, the reading controller may measure a plurality of time intervals Ty from continuous backhitch times and may derive continuous recalculated host transfer rates H*#m, H*#m+1, H*#m+2, ..., and the tape speed may be adjusted for a subsequent host transfer on the basis of the final recalculated host transfer rate H* being the mean value of the recalculated host transfer rates. Furthermore, a weight may be assigned to each of the plurality of recalculated host transfer rates H*#m, H*#m+1, H*#m+2, ..., the weighted values may be summed, and the sum may be utilized as the final recalculated host transfer rate H* to select an improved tape speed.

In accordance with the various embodiments described herein, when the tape drive 10 intermittently receives a plurality of commands to read a plurality of data elements from a host, a value H* may be determined by recalculating the host transfer rate H in consideration of time of a host transfer halt subsequent to the host reading request. The tape speed may be selected such that the drive transfer rate M is linked to the value H*. When the drive transfer rate M is selected on the basis of the recalculated host transfer rate H*, the buffer is less likely to become full during subsequent host transfer halts. As a result, generally it will be unnecessary for the tape drive to perform backhitching in order to position the tape at the location of a data element to be subsequently read. Accordingly, the various embodiments have the advantage of suppressing overhead during host transfer.

The above-described examples are provided with respect to read requests. However, the technique in accordance with the various embodiments also may be applied with respect to write requests. It should be noted that a backhitch occurs in the context of a read request when the buffer becomes full, whereas a backhitch occurs in the context of a write request when the buffer becomes empty.

The invention claimed is:

1. A tape drive for transferring data to a host, the tape drive comprising:
  a buffer for temporarily storing data to be transferred to the host;
  a tape for recording the data to be temporarily stored in the buffer;
  a read head for reading the data recorded on the tape and sequentially storing the data in the buffer; and
  a reading controller for initially setting a tape speed according to a first host transfer rate, driving the tape at the tape speed, measuring an amount of data stored in the buffer during a host transfer halt subsequent to a host transfer, determining whether the buffer is full of data, and, upon determining that the buffer is full of data, adjusting the tape speed such that a drive transfer rate is lower than the first host transfer rate by calculating a second host transfer rate in consideration of the host transfer and the host transfer halt and setting the tape speed according to the second host transfer rate, wherein the reading controller calculates the second host transfer rate on the basis of measured backhitching attributes resulting from the host transfer halt.

2. The tape drive of claim 1, wherein the reading controller invokes backhitching when the buffer becomes full of data.

3. The tape drive according to claim 1, wherein the measured backhitching attributes include a time interval between beginning points of a first backhitch and a second backhitch and an amount of data transferred during the time interval.

4. A tape drive recording system comprising:
   a host; and
   a tape drive connected to the host, the tape drive comprising:
      a buffer for temporarily storing data to be transferred to the host;
      a tape for recording the data to be temporarily stored in the buffer;
      a read head for reading the data recorded on the tape and sequentially storing the data in the buffer; and
      a reading controller for initially setting a tape speed according to a first host transfer rate, driving the tape at the tape speed, measuring an amount of data stored in the buffer during a host transfer halt subsequent to a host transfer, determining whether the buffer is full of data, and, upon determining that the buffer is full of data, adjusting the tape speed such that a drive transfer rate is lower than the first host transfer rate by calculating a second host transfer rate in consideration of the host transfer and the host transfer halt and setting the tape speed according to the second host transfer rate, wherein the reading controller calculates the second host transfer rate on the basis of measured backhitching attributes resulting from the host transfer halt.

5. The tape drive recording system according to claim 4, wherein the reading controller of the tape drive invokes backhitching when the buffer becomes full of data.

6. The tape drive recording system according to claim 4, wherein the measured backhitching attributes include a time interval between beginning points of a first backhitch and a second backhitch and an amount of data transferred during the time interval.

7. A method for selecting a tape speed for transferring data from a tape drive to a host, the method comprising:
   setting the tape speed initially according to a first host transfer rate;
   driving a tape at the tape speed;
   measuring an amount of data stored in a buffer of the tape drive during a host transfer halt subsequent to a host transfer;
   determining whether the buffer is full of data; and
   upon determining that the buffer is full of data, adjusting the tape speed such that a drive transfer rate is lower than the first host transfer rate by calculating a second host transfer rate in consideration of the host transfer and the host transfer halt and setting the tape speed according to the second host transfer rate, wherein the calculating step comprises measuring backhitching attributes resulting from the host transfer halt.

8. The method according to claim 7, further comprising invoking backhitching when the buffer becomes full of data.

9. The method according to claim 7, wherein the measured backhitching attributes include a time interval between beginning points of a first backhitch and a second backhitch and an amount of data transferred during the time interval.

\* \* \* \* \*